Dec. 16, 1924. 1,519,966
F. P. HUBER
CIRCUIT OPENING AND CLOSING DEVICE
Filed Oct. 16, 1923
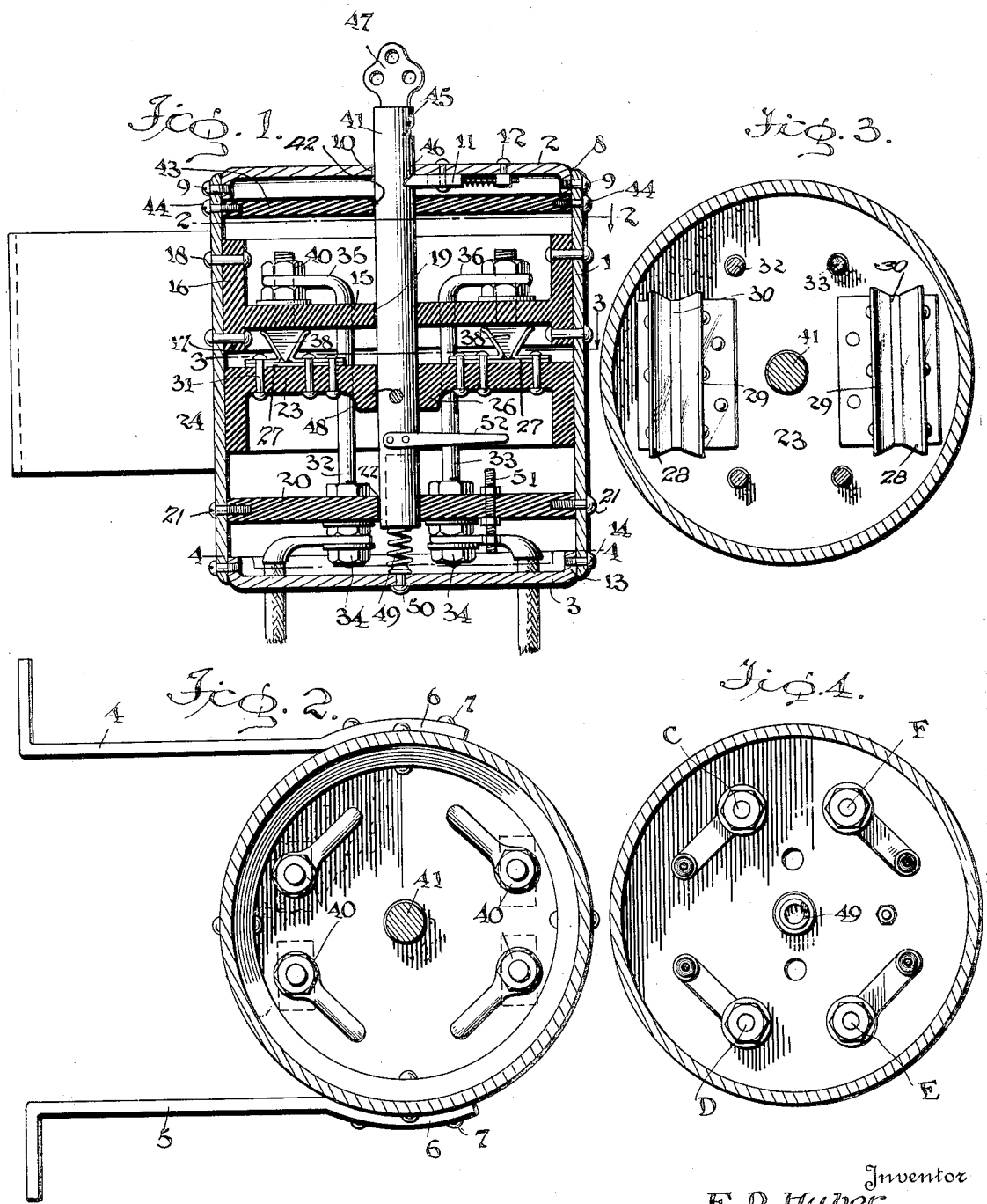
Inventor
F. P. Huber,
By Geo. F. Kimmel, Attorney Patented Dec. 16, 1924.

1,519,966

UNITED STATES PATENT OFFICE.

FRANK P. HUBER, OF NEW ORLEANS, LOUISIANA.

CIRCUIT OPENING AND CLOSING DEVICE.

Application filed October 16, 1923. Serial No. 668,856.

*To all whom it may concern:*

Be it known that I, FRANK P. HUBER, a citizen of the United States, residing at New Orleans, in the parish of Orleans and State of Louisiana, have invented certain new and useful Improvements in Circuit Opening and Closing Devices, of which the following is a specification.

This invention relates to a circuit opening and closing device, designed primarily for use in connection with motor vehicles, but it is to be understood that a device, in accordance with this invention can be employed for any purposes for which it is found applicable, and the invention has for its primary object to provide, in a manner as hereinafter set forth, a safety circuit opening and closing device adapted to be used for connecting electrical circuits for various purposes when it may be desired to break the circuit and instantly lock the device to prevent unauthorized persons from restoring the circuit, more particularly to provide a safety electrical opening and closing device adapted to be used on automobiles or similar vehicles to prevent unauthorized persons from using the vehicle, especially when it is left standing in the street by the owner.

A further object of the invention is to provide a circuit opening and closing device, in a manner set forth, with means including a spring controlled element for locking the device in position for closing the circuit and for locking the device to open the circuit, and with said device so set up as to provide for its release, only by a key, when said means has been shifted to lock the device in position to open the circuit.

Further objects of the invention are to provide a circuit opening and closing device, in a manner as hereinafter set forth, having manually shiftable means for locking the device in position to open a circuit, and to further set up a device of the class referred to which is simple in its construction and arrangement, strong, durable, thoroughly efficient and convenient in its use, readily installed with respect to automobiles or motor vehicles, and inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a vertical sectional view of a circuit opening and closing device in accordance with this invention.

Figure 2 is a section on line 2—2, Figure 1.

Figure 3 is a section on line 3—3, Figure 1.

Figure 4 is a section on line 4—4, Figure 1.

Figure 5 is an elevation of a circuit closing element.

A circuit opening and closing device in accordance with this invention is adapted to be fixedly secured to the chassis of a motor vehicle and arranged in suitable relation with respect to the floor of the vehicle, so that the controlling element of the device will project through the floor to enable it to be depressed by the foot of a driver for the purpose of locking the device in position to open the circuit. However, it will be stated that a circuit opening and closing device, in accordance with this invention, can be mounted at any suitable point on the vehicle, but preferably it is arranged below the floor and with the controlling element extended up through the latter.

Referring to the drawings in detail, 1 denotes a cylindrical casing provided at each end with a removable end plate and which are indicated at 2, 3. The end plates 2, 3, close the ends of the casing 1.

Oppositely disposed combined suspension and coupling brackets, as indicated at 4, 5, are employed for supporting the casing 1 in position. Each of the brackets has a curved portion 6 which is secured against the outer face of the casing 1 by the hold-fast devices 7.

The end plate 2 is formed with an inwardly extending annular flange 8, which is positioned against the inner face of the casing 1, and said flange 8, is secured with the casing 1 by the hold-fast devices 9. The end plate 2, centrally thereof, is formed with an opening 10. Arranged against the inner face of the end plate 2 is a spring controlled locking device 11 and which is secured to the plate 2 by the hold-fast devices 12. The locking bolt of the spring controlled locking device is adapted to project partly across the opening 10, at the center of the plate 2, for the purpose of engaging the controlling element, to be hereinafter referred to, of the device to detachably lock said element from movement.

The end plate 3 has an inwardly extending annular flange 13, which is arranged against the inner face of the casing 1 and is secured with the casing 1 by the hold-fast devices 14.

Fixedly secured within the casing 1, near the upper end thereof, is a flanged disk 15 of insulation. The disk 15 has oppositely extending annular flanges 16, 17, which are secured to the casing 1 by the hold-fast devices 18. The disk 15, centrally thereof, has an opening 19 which is arranged in alignment with the opening 10.

Arranged within the casing 1, near the lower end thereof, is a disk 20 of insulation, which is fixedly secured in position by the hold-fast devices 21 and is provided centrally with an opening 22, arranged in alignment with the openings 10 and 19.

Interposed between the disks 15 and 20, is a shiftable flanged disk 23 of insulation, and said disk 23 has a depending annular flange 24 and a centrally disposed opening 25 which is arranged in alignment with the openings 10, 19 and 22, and the said disk 23 is furthermore provided on its lower face with an annular boss 26, having its inner face registering with the wall of the opening 25.

Fixedly secured to the upper face of the disk 23, is a pair of opposed contact elements and each of which is arranged at one side of the opening 25. Each of said contact elements comprises a rectangular metallic plate 27, upon which is arranged a pair of spaced angle shaped oppositely disposed metallic contact pieces 28, 29, forming what may be termed a V-shaped socket 30. The plate 27 and the contact pieces 28 and 29 are fixedly secured together and to the disk 23 by the hold-fast devices 31.

Extending up through the disk 20 are two pair of angle-shaped bus bars, and the bus bars of one pair are indicated at 32, and the bus bars of the other pair at 33. The bus bars depend below the disk 20 and each carries securing means as at 34, for connecting circuit conductors therewith, and the said securing means 34 prevent vertical movement of the bus bars with respect to the disk 20. The bus bars project upwardly through the disk 25 and also through and above the disk 15, and the angle-shape portions 35 of the bus bars 32, overhang the disk 15, and the angle-shape portions 36 of the bus bars 33 overhang the disk 15. The angle-shape portions 35 are oppositely disposed with respect to the angle-shape portions 36. The angle-shape portions 35 extend towards each other, and the angle-shape portions 36 extend towards each other. Each angle-shape portion has depending therefrom a circuit opening and closing member consisting of a threaded shank 37, which terminates centrally of a head 38, conforming in contour to the shape of the socket 30. The shanks 37 of each circuit opening and closing member, which is referred to generally by the reference character 39, Figure 5, are connected to an angle-shape portion of a bus bar by securing devices 40, which consist of a pair of superposed nuts, one arranged above and the other below the angle-shape portion and with the lower nut bearing against a washer positioned on the disk 15. The shanks 37 extend down through the disk 15, and the heads 38 of the members 39 are positioned against the lower face of the disk 15. The heads 38 of the members 39 carried by the angle-shape portions 35, are arranged in spaced relation and a similar arrangement is had with respect to the heads 38 of the members 39 carried by the angle-shape portion 36. The heads 38 of the members 39 are arranged in the path of the contacting elements so that when the disk 23 is shifted upwardly, the heads 38 will enter the sockets 30 and engage with the contact pieces 28, 29, thereby closing the circuits. When the disk 23 moves away from the disk 15, the heads 38 are shifted clear of the sockets 30, thereby opening the circuits.

The disk 23 is shifted through the medium of a spring controlled element consisting of a substantially elongated tube 41, which normally projects above the end plate 2, and extends through the openings 10, 19, 22 and 25, and also through an opening 42, formed in a disk 43 of insulation, which is secured within the casing 1, near the upper end thereof, by the hold-fast devices 44. The disk 43 is arranged in close proximity to the locking element 11.

The tube 41 is provided with a pair of notches 45, 46, for the reception of the locking bolt of the locking element. The tube 41 is vertically movable and when in position, as shown in Figure 1, the locking bolt engages in the notch 46, whereby the circuit opening and closing device is locked in position to maintain the circuits closed. When the tube 41 is depressed so that the locking bolt of the locking element will engage in the notch 45, the disk 23 will be locked in a lowered position and with the contacting elements clear of the heads 38, so as to lock the circuit opening and closing device in position whereby the circuits will be maintained open. The tube 41 can only be released from its lowered position, that is to say, when the locking bolt is seated in the notch 45 by a key 47. To provide for the shifting of the disk 23 by the tube 41, the latter is secured by a bolt or other suitable means, as indicated at 48, to the disk 23. The controlling spring for the tube 41 is indicated at 49 and which has its lower end connected with the plate 43, as at 50, and its upper end extended into the lower portion of the tube 41, as shown in Figure 1.

Carried by the disk 20 is a magneto ground wire connection and terminal, as indicated at 51, and which is arranged in the path of a resilient contact 52, carried by the tube 41.

The end plate 33 is provided with suitable openings for the passage of the conductors or circuit wires.

The circuit opening and closing device is placed between the battery and motor nearest to the battery, and by reference to Figure 4 the bus bar, as indicated at D leads to the negative side of the battery, the bus bar indicated at E connects to the frame or motor base, the bus bar as indicated at C connects with the positive side of the battery, and the bus bar as indicated at F connects with the horn, lights, starter or ignition.

The device is to cut off all current on ground and positive lines so that it is impossible to jump any wires.

From the foregoing description taken in connection with the accompanying drawings, a circuit opening and closing device is set up, having means for locking it maintained in circuit opening and closing position, and which will prevent the closing of the circuit surreptitiously, and although the preferred embodiment of the device is as illustrated and described, yet it is to be understood that changes in the details of construction can be had which will fall within the light of the invention as claimed.

What I claim is:—

1. A circuit opening and closing device for the purpose set forth, comprising a pair of outer insulation elements and an inner insulation element, said inner element shiftable relatively to said outer elements, circuit forming means including two pairs of bus bars extending through said elements and provided with means to prevent the shifting thereof relatively to said elements, two pairs of circuit opening and closing members, each pair of members connected with the ends of a pair of bus bars, socket forming contact means carried by said inner element and engageable with and disengageable from said members for closing and opening a circuit, a shiftable spring controlled element extending through said insulation elements and fixed to the inner element for shifting the same, and means for locking said spring controlled element in position to open and close said circuit.

2. A circuit opening and closing device for the purpose set forth, comprising a pair of outer insulation elements and an inner insulation element, said inner element shiftable relatively to said outer elements, circuit forming means including two pairs of bus bars extending through said elements and provided with means to prevent the shifting thereof relatively to said elements, two pairs of circuit opening and closing members, each pair of members connected with the ends of a pair of bus bars, socket forming contact means carried by said inner element and engageable with and disengageable from said members for closing and opening a circuit, a shiftable spring controlled element extending through said insulation elements and fixed to the inner element for shifting the same, means for locking said spring controlled element in position to open and close said circuit, and means carried by said spring controlled element and one of said outer insulation elements for opening and closing a magneto circuit.

3. A circuit opening and closing device for the purpose set forth, comprising a pair of outer disks of insulation and an inner disk of insulation, a housing therefor, means for fixedly securing the outer disks to said housing, said inner disk shiftable relatively to said outer disks, one of said outer disks and said inner disk having cooperating means for opening and closing a circuit on the shifting of the inner disk, circuit connections extending through said disks, a shiftable spring controlled tubular element extending through said disks and fixedly connected to said inner disk and providing means to shift the latter, said element provided with a pair of notches, and a key release locking element carried by said housing and engaging in one of said notches for locking said element in position to maintain the circuit closed, and engaging in the other of said notches for locking said element to maintain the circuit open.

4. A circuit opening and closing device for the purpose set forth, comprising a pair of outer disks of insulation and an inner disk of insulation, a housing therefor, means for fixedly securing the outer disks to said housing, said inner disk shiftable relatively to said outer disks, one of said outer disks and said inner disk having cooperating means for opening and closing a circuit on the shifting of the inner disk circuit connections extending through said disks, a shiftable spring controlled tubular element extending through said disks and fixedly connected to said inner disk and providing means to shift the latter, said element provided with a pair of notches, a key release locking element carried by said housing and engaging in one of said notches for locking said element in position to maintain the circuit closed, and engaging in the other of said notches for locking said element to maintain the circuit open, and means carried by said element and the other of said outer disks and cooperating with each other for controlling the opening and closing of a magneto circuit.

5. A circuit opening and closing device comprising circuit forming connections including two pairs of bus bars, a pair of circuit opening and closing members connected with the ends of each pair of bus bars, a pair of shiftable contact elements cooperating with said members for opening and closing the circuit, a spring controlled shiftable element connected with said contact elements for shifting them, said spring controlled element provided with a pair of notches, and a key operated locking device engaging in one of said notches for maintaining the circuit open and engaging in the other of said notches for maintaining the circuit closed.

6. A circuit opening and closing device comprising circuit forming connections including two pairs of bus bars, a pair of circuit opening and closing members connected with the ends of each pair of bus bars, a pair of shiftable contact elements cooperating with said members for opening and closing the circuit, a spring controlled shiftable element connected with said contact elements for shifting them, said spring controlled element provided with a pair of notches, a key operated locking device engaging in one of said notches for maintaining the circuit open and engaging in the other of said notches for maintaining the circuit closed, and means carried by said spring controlled element for opening and closing a magneto circuit.

In testimony whereof, I affix my signature hereto.

FRANK P. HUBER.